March 7, 1944. W. Q. MARTIN 2,343,787
DRIVE MECHANISM FOR STRIPPERS OF CARDING MACHINES
Filed Sept. 5, 1942 2 Sheets-Sheet 1
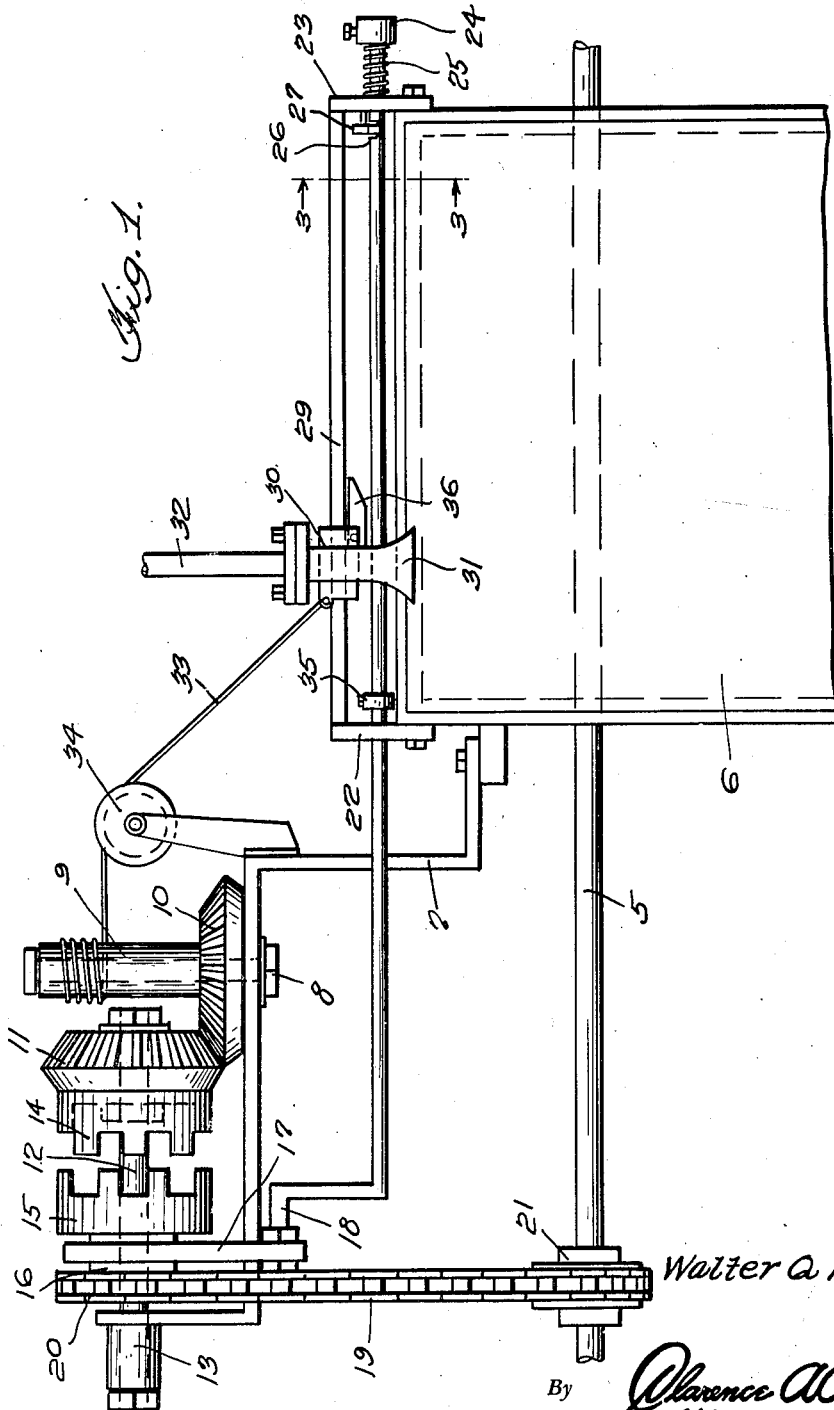
Inventor
Walter Q. Martin
By Clarence A. O'Brien
and Harvey B. Jacobson
Attorneys

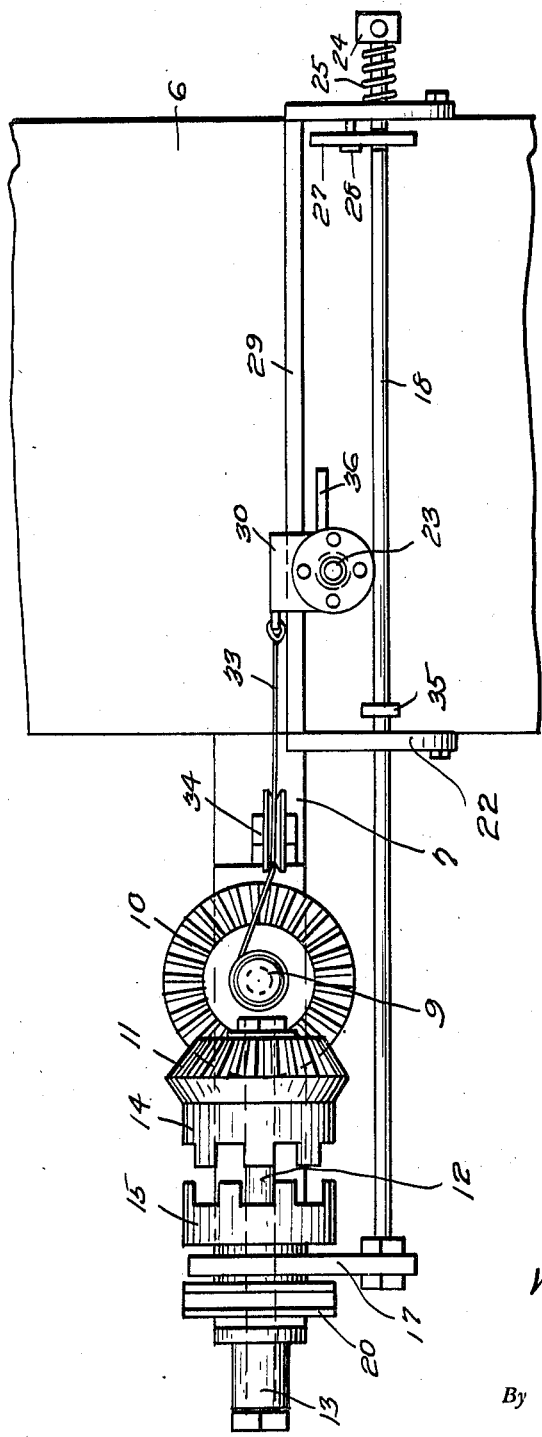
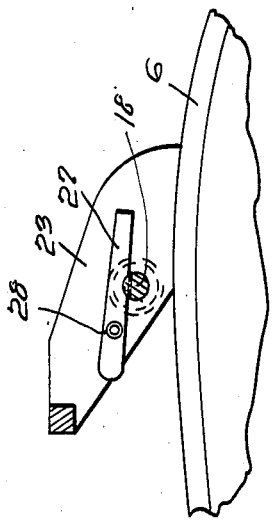

Patented Mar. 7, 1944

2,343,787

UNITED STATES PATENT OFFICE 2,343,787

DRIVE MECHANISM FOR STRIPPERS OF CARDING MACHINES

Walter Q. Martin, Hickory, N. C.

Application September 5, 1942, Serial No. 457,505

3 Claims. (Cl. 19—109)

The present invention relates to new and useful improvements in carding machines and more particularly to carding machines employing pneumatic stripping mechanism and the invention has for its primary object to provide a drive attachment for the stripper embodying means for automatically interrupting the operation thereof after the stripping action has been completed.

A further object is to provide an apparatus of this character of simple and practical construction, which is efficient and reliable in performance, relatively inexpensive to manufacture and installed in operative position on a conventional form of carding machine and otherwise well adapted for the purposes for which the same is intended.

Other objects and advantages reside in the details of construction and operation as more fully hereinafter described and claimed, reference being had in the accompanying drawings forming part hereof, wherein like numerals refer to like parts throughout and in which:

Figure 1 is a view in elevation showing the drive mechanism for the stripper.

Figure 2 is a top plan view thereof.

Figure 3 is a fragmentary sectional view taken substantially on a line 3—3 of Figure 1.

Referring now to the drawings in detail wherein for the purpose of illustration I have disclosed a preferred embodiment of the invention, the numeral 5 designates the doffer shaft on which the doffer 6 is operatively mounted, the shaft and doffer being of conventional construction.

Secured to one of the stationary end plates of the doffer is a bracket 7 on which is supported a shaft 8 rising therefrom and freely journaled on the shaft is a drum 9 having a bevel gear 10 secured at its lower end. Operatively engaged with the gear is a bevel gear 11 freely mounted on a shaft 12 journaled in a bearing 13 also mounted on the bracket 7.

To one side of the gear 11 is formed a toothed clutch member 14 engageable by a toothed clutch member 15 slidably mounted on the shaft 12, the clutch member 15 being operated by a clutch collar 16 by means of a yoke 17 secured on one end of a rod 18. The shaft 12 is driven by a chain 19 and sprockets 20 and 21, respectively, secured to the shaft 12 and shaft 5.

The rod 18 is slidably mounted in guides 22 and 23 rising from the opposite stationary end plates of the doffer, the end of the rod remote from the yoke 17 having a collar 24 adjustably secured thereon engaged by a coil spring 25 mounted on the rod and bearing against the guide 23 to urge the clutch member 15 into engagement with the clutch member 14. The rod 18 is formed with a notch 26 in which a latch 27 is engageable, the latch being pivoted intermediate its ends as shown at 28 to the guide 23, the latch securing the rod 18 against the tension of the spring 25 with the clutch member 15 disengaged.

A rod 29 is supported transversely above the doffer by the guides 22 and 23 and slidably mounted on the rod 29 is a slide 30 to which the suction nozzle 31 is attached, the nozzle being connected to a suction pipe 32 leading to a suitable suction mechanism.

A cord or flexible wire member 33 is attached at one end to the slide 30 and extends over a pulley 34 for attachment to the drum 9, the drum serving to wind the cord in a manner to draw the suction nozzle 31 across the doffer when the clutch members 14 and 15 are engaged.

A stop collar 35 is adjustably secured on the rod 18 in the path of the suction nozzle 31 for engagement by the nozzle in order to slidably actuate the rod 18 and disengage the clutch member 15 when the nozzle reaches or approaches the end of the doffer.

A latch trip member 36 is secured to the slide 30 and is adapted to ride over one end of the latch 27 to release the same from the rod 18 when the suction nozzle is moved into a position to begin the stripping action.

It is believed the details of construction, advantages and manner of use of the device will be readily understood from the foregoing without further detailed explanation.

Having described the invention, what is claimed as new is:

1. In combination, a doffer shaft for a carding machine having a doffer thereon, a suction nozzle, means slidably supporting the nozzle for movement transversely of the doffer, a drum, a flexible member connecting the nozzle to the drum for moving the nozzle in one direction upon actuation of the drum, a drive connection between the drum and shaft and including a clutch mechanism, a spring actuated clutch operating rod normally holding the clutch in engaged position, a collar on the rod in the path of movement of the nozzle for actuating the clutch into its disengaged position, catch means securing the clutch in disengaged position and means carried by the nozzle for releasing the catch means upon a predetermined movement of the nozzle in an opposite direction.

2. In combination, a doffer for a carding machine, a suction nozzle, means slidably supporting the nozzle for movement transversely of the doffer, power operated means for moving the nozzle in one direction and including a clutch device, a clutch operating member disposed in the path of movement of the nozzle in said direction for disengaging the clutch and interrupting movement of the nozzle, said nozzle being manually movable in an opposite direction, spring means for the clutch operating member adapted to engage the clutch, and a trip device arranged to hold the clutch operating member in its disengaged position, said trip device also being disposed in the path of the nozzle for releasing the trip upon completion of the manual movement of the nozzle.

3. In combination, a doffer for a carding machine, a suction nozzle, means slidably supporting the nozzle for movement transversely of the doffer, power operated means for moving the nozzle in one direction and including a clutch device, a clutch operating member, spring means for moving the member into clutch engaging position, a trip device adapted for retaining the clutch operating member in its disengaged position, means carried by the nozzle and arranged for releasing the trip device upon movement of the nozzle in one direction, and means carried by the clutch operating member and disposed in the path of opposite movement of the nozzle for disengaging the clutch.

WALTER Q. MARTIN.